United States Patent Office

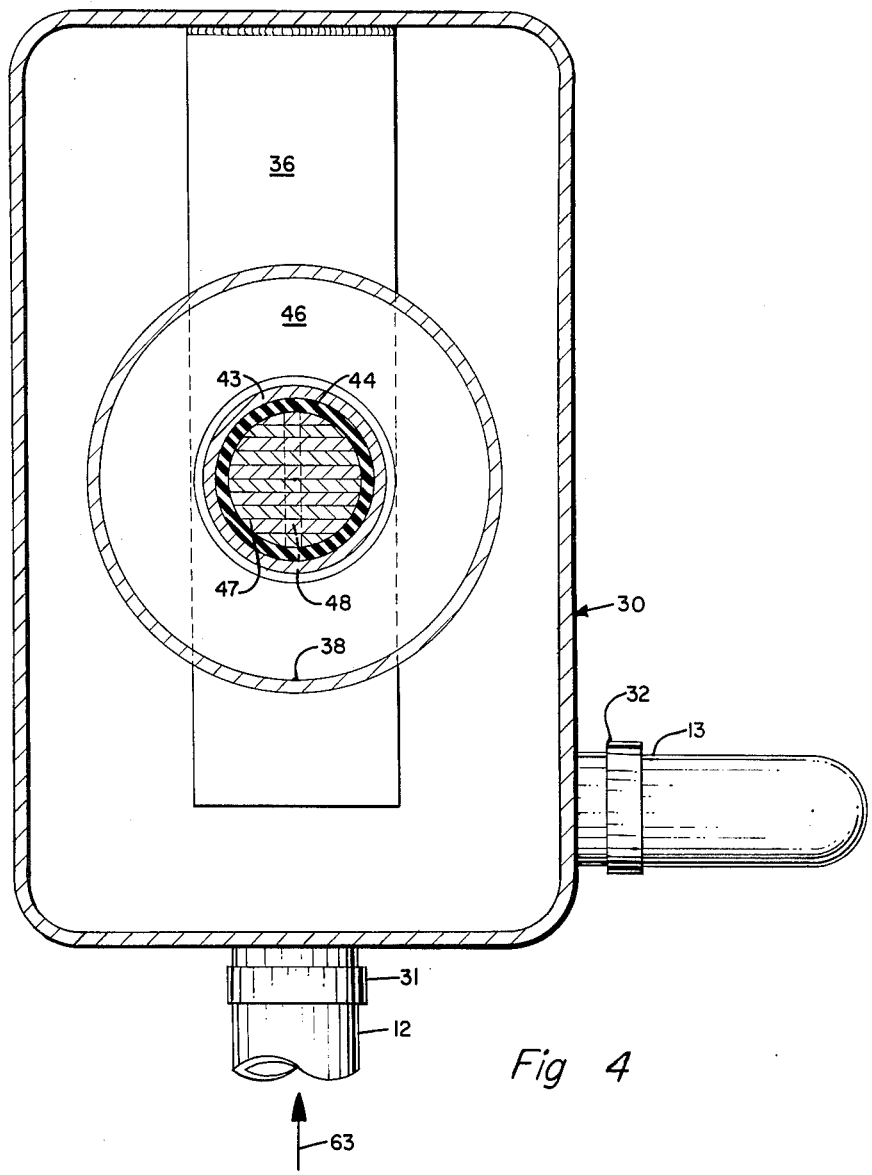

3,224,250
Patented Dec. 21, 1965

3,224,250
GAS LIQUID DETECTOR
Donald L. Ming, West Covina, and Bernard Case, Tarzana, Calif., assignors to Aerojet-General Corporation, Azusa, Calif., a corporation of Ohio
Original application Dec. 26, 1957, Ser. No. 705,407. Divided and this application Feb. 27, 1961, Ser. No. 92,095
5 Claims. (Cl. 73—19)

This invention relates to gas-liquid detectors and has for an object to provide a gas-liquid detector which will quickly sense the presence of either gas or liquid in a fluid.

This is a divisional application of our co-pending application, Serial No. 705,407, filed December 26, 1957, now abandoned.

In systems containing liquids or conduits through which liquids flow, gas is often present with the liquid; and it is sometimes desirable to sense or signal the presence of either the gas or the liquid. In some cases it is desirable that the gas be bled off from the liquid; a typical example of such a circumstance is a rocket motor system operated by liquid propellant. It is a common practice to supply liquid propellant to a rocket motor through a conduit from a container of the propellant which is pressurized by gas to force the propellant to flow into the chamber of the rocket motor against the pressure in that chamber. Sometimes the gas becomes entrapped with the liquid and flows through the conduit toward the motor. It is generally desired to sense the presence of the gas in the conduit before it reaches the motor and to bleed the gas off so that the fluid arrives at the motor entirely liquid. In the case of liquid rocket motor systems a detector for sensing the condition of gas or liquid should be operable over wide temperature and pressure ranges; and also should be capable of withstanding corrosion or other damage when used with active propellant such as, for example, nitric acid.

In accordance with the present invention, we provide a sensing arrangement or system which indicates the condition of gas or liquid in a conduit or chamber; and which is well adapted for use with the liquid propellant of rocket motors. The invention is carried out by use of a vibratory reed of magnetic material arranged in the magnetic field of a pair of coils. An amplifier is associated with the coils such that one of the coils is at the amplifier output and the other of the coils at the amplifier input. Due to the coupling between the output and input coils when the reed vibrates, feedback occurs between the output and input of the amplifier which puts the amplifier in an oscillatory condition.

A feature of the arrangement resides in placing the vibratory reed in the fluid to be sensed, so that the reed is located either in gas or liquid depending on whether gas or liquid is present at the time. When the medium around the reed is gaseous, there is little fluid viscosity and the reed vibrates freely to create the degree of feedback for setting the amplifier to its oscillatory condition. When the medium around the reed is liquid the relatively higher viscosity of the liquid damps the reed to reduce the feedback condition and oscillation does not occur.

A suitable responsive device such as a signal at the amplifier output can be used to indicate the condition of oscillation or non-oscillation of the system.

In accordance with a preferred feature, a valve can be operated to bleed off gas when the system senses the presence of gas.

The foregoing and other features will be more fully understood from the following detailed description and accompanying drawings of which:

FIG. 4 is a cross section taken at line 4—4 in FIG. 3; and

FIG. 5 shows an enclosed tank for storage of fluid showing attachment of a plurality of gas-liquid sensing elements, such as in FIGS. 1 to 4, for monitoring of the liquid or gas in the enclosed tank.

Figure 1:
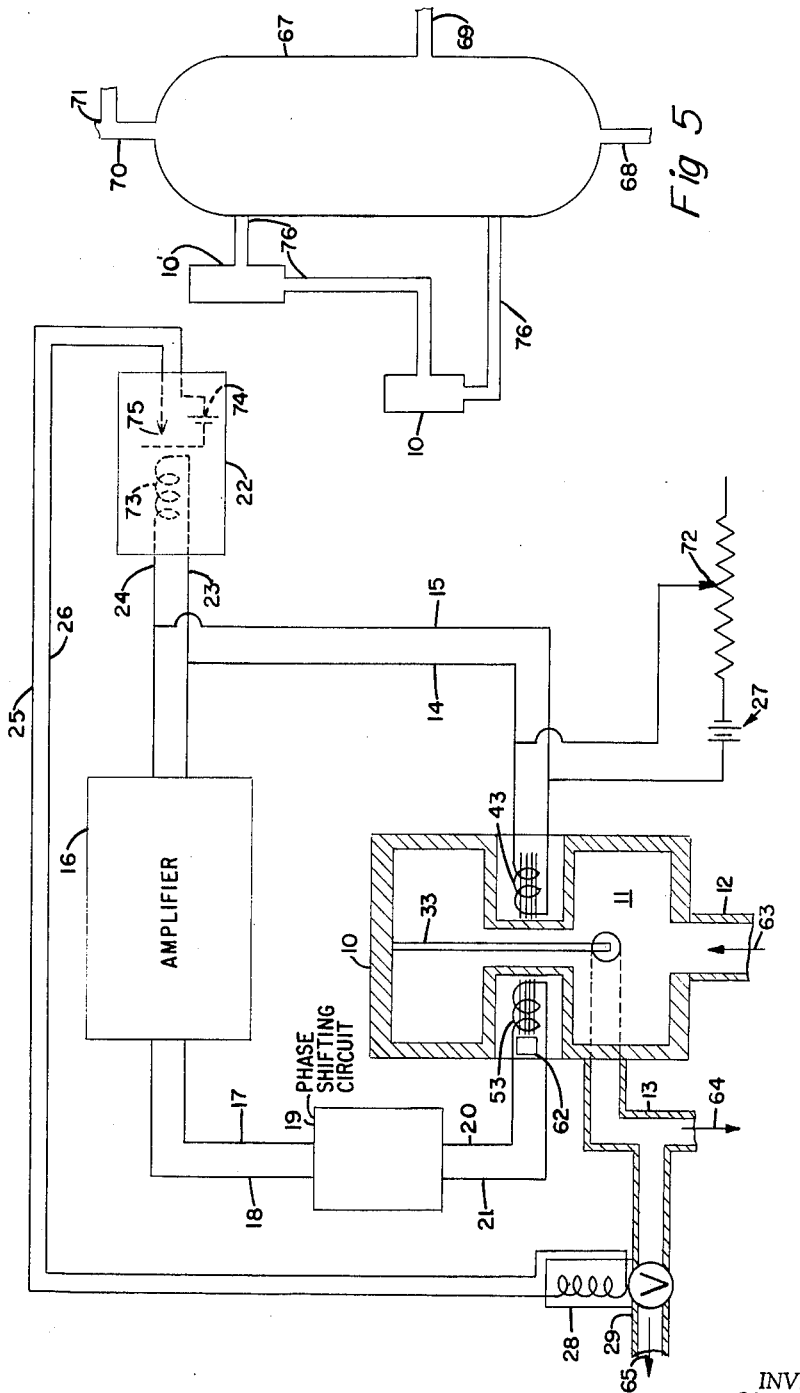
FIG. 1 shows a schematic representation of an electromechanical oscillatory system according to this invention, incorporated into a fluid conduit for detecting gas or liquid in the fluid conduit.

Referring to the drawings, there is shown schematically in FIG. 1 a system according to this invention which operates as a feedback oscillator. A sensing element 10 senses the viscosity of a fluid in its chamber 11 which is supplied from an inlet conduit 12 and discharges to an outlet conduit 13. The sensing element 10 has an electrical input supplied through a pair of electrical leads represented by the lines 14 and 15 which takes feedback voltage from the output of a suitable electronic amplifier 16 represented in FIG. 1 in block diagram form. The amplifier 16 is supplied with power from a suitable source (not shown) and with a signal from the output of the sensing element 10 through a pair of electrical leads represented by the lines 17 and 18 between the amplifier 16 and a suitable phase shifting circuit means 19, represented in block diagram form. Two leads, represented by the lines 20 and 21, electrically connect the phase shifting circuit 19 to the output of the sensing element 10. A relay 22 has a coil 73 shown in phantom lines connected by a pair of leads, represented by the lines 23 and 24, to the output of the amplifier 16. Output leads of the relay 22 are represented by the lines 25 and 26 and they are shown connected in series to a D.C. supply 74 and relay contacts 75, both of which are shown in phantom lines.

A D.C. power supply source 27 is provided for the input to the sensing element 10 to bias its input circuit at a suitable value so that it may be provided with a satisfactory driving power. The power supply 27 is adjustable to a suitable voltage by a rheostat 72 provided in series with it. Some other way may, of course, be provided to supply a suitable bias, such as bias supplied through the leads 14 and 15 from a bias taken at the output of a suitable amplifier 16. A solenoid bleed valve 28 is electrically connected to the output leads 25 and 26 of the relay 22. The solenoid bleed valve 28 is located in a gas bleed conduit 29 which is in fluid communication with outlet conduit 13.

Figure 2:
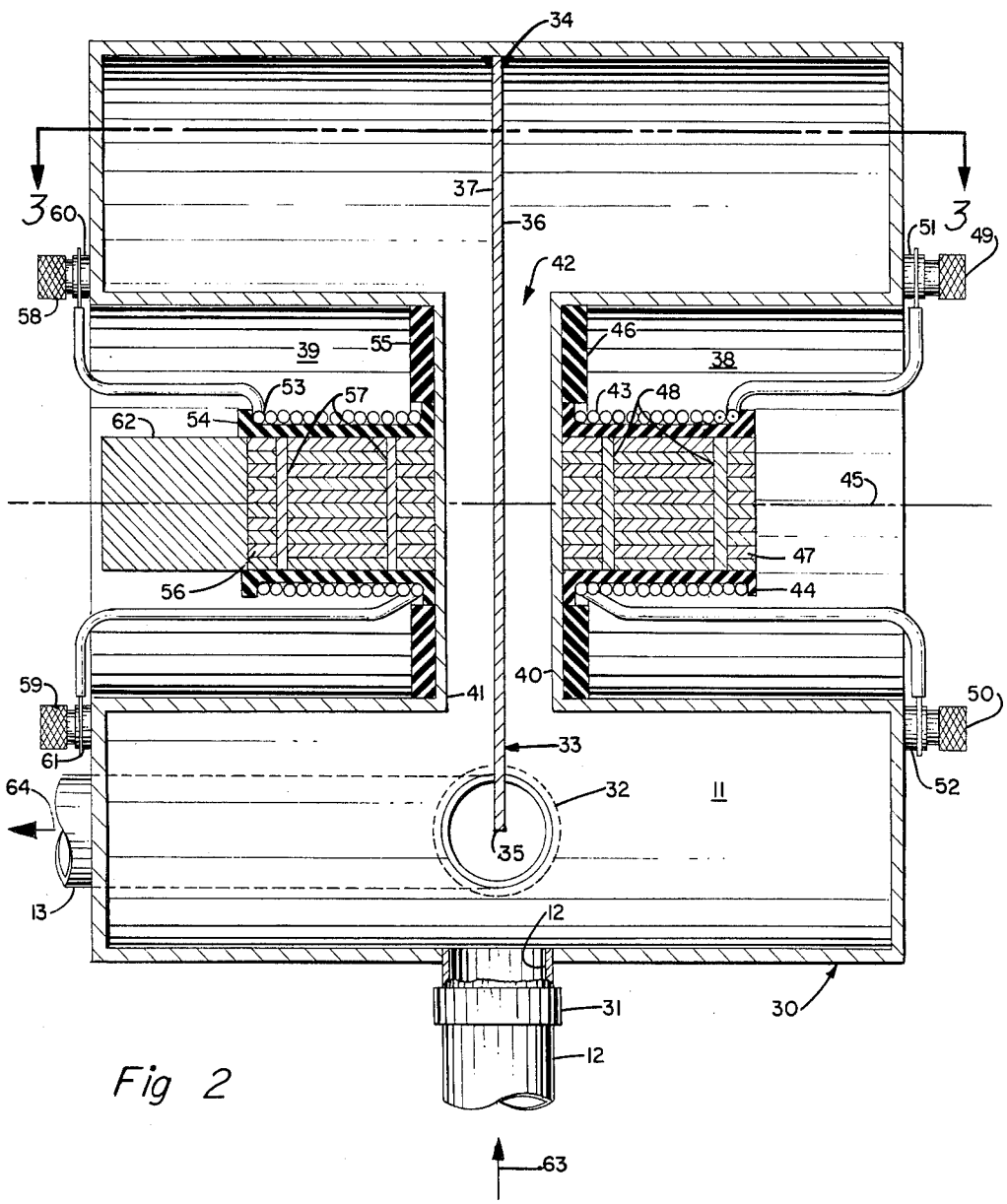
FIG. 2 is an enlarged veiw showing the details of construction of the combination gas and liquid sensing element schematically represented in the device of FIG. 1.
Figure 3:
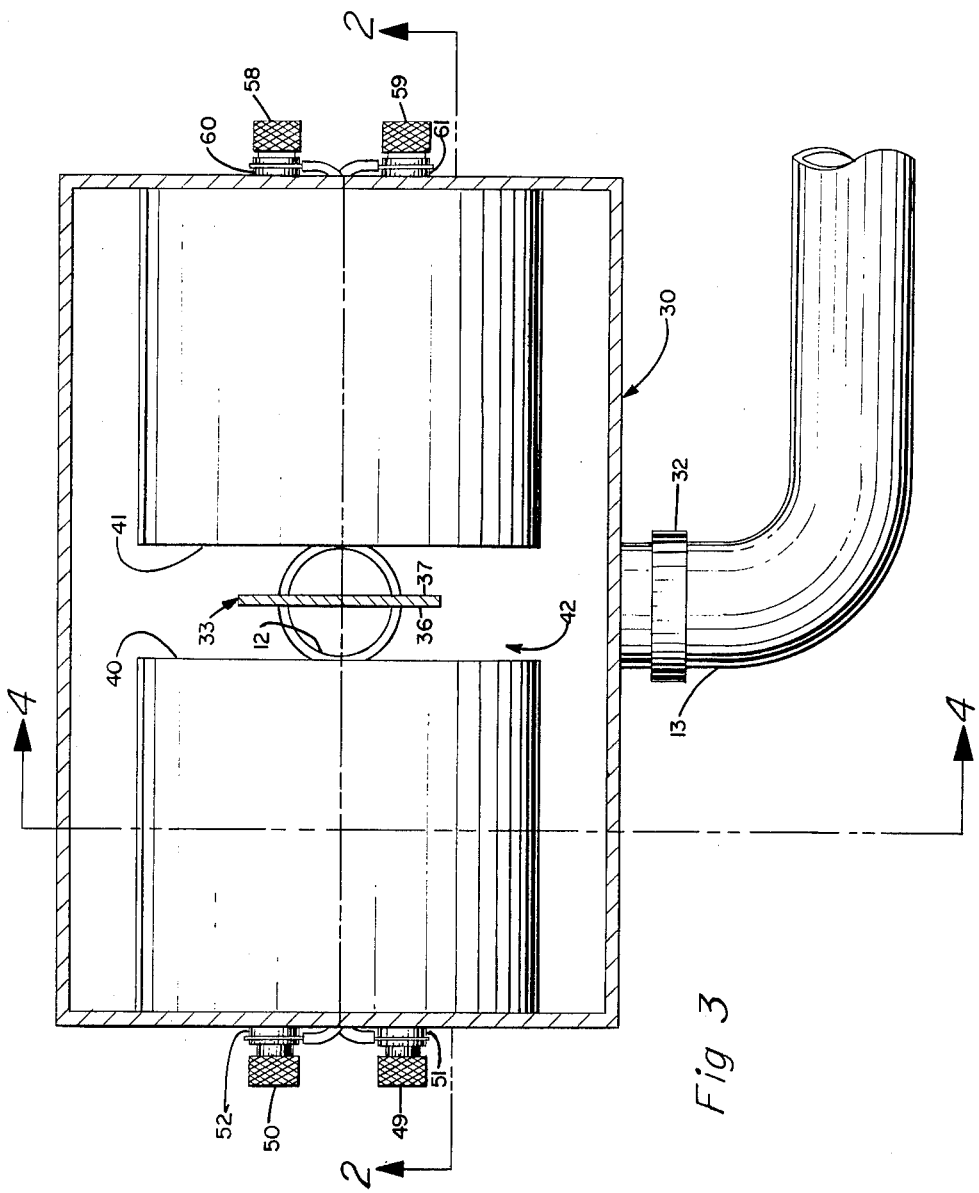
FIG. 3 is a cross section taken at line 3—3 in FIG. 2.

The electronic amplifier 16, the phase shifting circuit means 19, the feedback connection to the amplifier by means of leads 14 and 15, the relay 22, and the solenoid bleed valve 28 are all well known electrical means which operate in a well-known manner and therefore need no further discussion here. The sensing element 10, shown in detail in FIGS. 2, 3 and 4, comprises a case 30 of substantially non-magnetic material preferably of stainless steel, so as to be resistant to highly corrosive fluids and strong enough to be operable under a wide range of temperature and pressure conditions. The inlet conduit 12 and the outlet conduit 13 are suitably connected to the case 30 by couplings 31 and 32 respectively, which are preferably pressure-proof and corrosion-proof in the case of use with high pressure and corrosive fluids. The inlet conduit 12 enters the interior chamber 11 through the bottom of the case. At a side of the case near its bottom where the conduit 12 enters, the conduit 13 passes from the case. Conduit entrance 12 and conduit outlet 13 are therefore preferably close together and are disposed with their centers in one place in space.

A reed 33 of magnetic material extends substantially the length of the interior of the case. The reed is attached to the case, for example by welding at 34, on one of its ends. The opposite end of the reed at 35 is free and terminates in the vicinity of the conduit outlet 13. The reed 33 is preferably centrally disposed with respect to the inlet conduit 12. The reed has two larger sides 36 and 37, preferably flat, which are substantially parallel to one another.

The case 30 is provided with two exterior chambers 38 and 39 which extend inward into the case and terminate in substantially flat end members, 40 and 41 respectively, which are parallel and opposite to one another, being separated by a space 42 only wide enough for the reed 33 to vibrate freely in. The reed 33 is disposed through the space 42 with its sides 36 and 37 substantially parallel to the end members 40 and 41 and preferably centrally located in the space 42. The exterior chambers 38 and 39 may be of any convenient shape in cross section, a cylindrical shape being preferred for the particular embodiment shown.

In the chamber 38, a driving coil 43 is mounted on an electrical insulation spool 44, of rubber or the like, so as to be concentrically disposed about an imaginary center line 45. The coil 43 and its spool 44 are mounted in the deepest part of the chamber 38 within a mounting 46, which may conveniently be a heavy rubber washer or the like. The core of the coil 43, within the spool, comprises a plurality of laminated plates 47 of magnetic material which are held together by rivets 48 passed through the plates. The plates 47 are substantially separated from one another, by surface oxides, varnish or the like, in a common and well-known laminated construction so as to minimize the effect of eddy currents generated in the core. The two ends of the wire of the coil 43 terminate at electrical terminal posts, 49 and 50 respectively which are mounted on insulators 51 and 52 attached to the outside of the case 30. The D.C. bias 27 and the amplifier feedback from the leads 14 and 15 are applied to the terminal posts 49 and 50.

The exterior chamber 39 which opposes the exterior chamber 38 holds a pickup coil 53. The coil 53 is similar to the coil 43 having an axis preferably coincidental with the extended center line 45. Associated with coil 53 are, a spool 54, a mounting 55, a core of laminated plates 56 of magnetic material having rivets 57, and two terminals 58 and 59 each of which are mounted on the case 30 by insulators 60 and 61 respectively. A permanent magnet 62 also is provided at an end of the core within the end of the spool 54 which is directed toward the open end of the chamber 39. The permanent magnet 62 has its magnetic field oriented substantially parallel to the imaginary center line 45. The leads 20 and 21 to the phase-shifting circuit 19 are connected to the terminals 58 and 59, so as to supply output of the pickup coil 53 to the electronic amplifier 16.

An arrow 63 into the conduit 12 represents fluid into the chamber 11, and an arrow 64 out of the conduit 13 represents fluid out of the chamber 11. An arrow 65, as shown in FIG. 1, represents gas in the gas bleed conduit 29 which passes the solenoid bleed valve 28 when this valve is open. It is to be understood that the conduits, represented by discontinuous structure in the figures, actually extend to their operating parts. For example, the conduit 12 extends to a fluid supply of liquid which may contain gas; the conduit 13 extends to fluid injectors within the thrust chamber of rocket engine or the like; and the gas bleed conduit extends to wherever the gas is discharged, as into the atmosphere.

*Operation*

This system operates as a feedback oscillator, the vibratory reed 33 in its fluid chamber 11 being apart of the oscillatory system. Essentially the reed 33 is incorporated into a fluid conduit system such as the propellant conduits 12 and 13 of a rocket engine, or the like, where it distinguishes between gas and liquid because of the difference in viscosity of the gas and liquid. The relay 22 has contacts 75 which are closed during the time the reed 33 vibrates freely in a gas medium within the chamber 11, thus opening the bleed solenoid valve 28 in the gas bleed conduit 29 and permitting expulsion of gas from the propellant conduit 13 by maintaining the valve open during which time liquid fluid advances behind the gas and expels it from the conduit through the open valve 28. When liquid reaches the reed 33, the reed vibration is suddenly damped out and the contacts of the relay 22 open, thus causing the solenoid bleed valve 28 to close and prevent dumping of liquid propellant 64 through the gas bleed conduit 29.

To produce vibratory motion of the reed 33, when a gas surrounds the reed, energy is imparted to the reed by the driving coil 43 from the feedback portion of the output of the amplifier 16 through the leads 14 and 15. The resulting motion of the magnetic reed induces a voltage in the pickup coil 53 which is fed to the phase-shifting circuit 19 where its phase relationship is adjusted so as to be in phase with the wave energy of the amplifier 16 so as to sustain electrical oscillation of the amplifier and mechanical vibratory motion of the reed. The output voltage of the phase-shifting circuit is thus fed to the input of the electronic amplifier 16 in a suitable phase relationship. The reed vibration, present only when a gaseous fluid surrounds the reed 33, is self-starting by reason of the amplifier having a high amplifier gain and also due to noise voltages inherent in the electrical portion of the oscillatory system. Some slight reed vibration will occur when a liquid fluid is sensed but not enough to cause the relay coil 73 to hold the contacts 75 open. With the contacts 75 closed, the solenoid valve 82 remains open. Each of the coils 43 and 53 have magnetic coupling to the reed 33 through the members 40 and 41 respectively, of the case 30 which is of non-magnetic material. The magnetic circuit of the pickup coil includes the permanent magnetic 62 in addition to the laminated core of magnetic material. The permanent magnet 62 polarizes the pickup coil. A change in the D.C. flux in the magnetic circuit of the pickup coil is produced by any displacement in the position of the vibratory reed which changes the total reluctance in this magnetic circuit, thus generating a voltage in the pickup coil.

The driving coil 43 assembly is polarized by maintaining a D.C. bias current in it of sufficient magnitude from the D.C. source 27 to provide satisfactory driving power for the particular gaseous and liquid fluids sensed by the system. For maximum driving efficiency, the reed is driven at its natural frequency of vibration in the particular gaseous fluid, the natural frequency being dependent on physical factors such as the length of the reed, the material which it is made of, and the fluid in which it must vibrate. Because the quality rating or "Q," of such a resonant vibratory reed is high, very little deviation in driving frequency can be tolerated. This problem of maintaining the proper driving frequency is solved by the feedback self-resonant system employed in this device so that the reed 33 will always be energized at, or very near, its natural resonant frequency. For a self-resonant system such as used in the present device, factors such as reed corrosion, temperature changes, introduction of foreign matter adherent to the reed surfaces, or pressure changes, can change the resonant frequency of the reed, as in any other such system. Performance of this system is not impaired, however, by the above factors, since the driving frequency automatically changes to the proper frequency in such a self-resonant system as this.

This combination gas-liquid detector will automatically bleed liquid propellant conduits of gas to ensure simultaneous arrival of liquid fuel and oxidizer into rocket motor injectors. In addition, it can be used to merely signal viscosity condition of a fluid rather than to operate a solenoid valve in response to viscosity condition of a fluid. It is operable under wide temperature and pressure conditions, in highly corrosive fluids such as fuming nitric acid, and in highly inflammable fluids. The device is fast acting and highly reliable.

FIG. 5 shows how one or more of the sensing elements 10 and 10′ of a gas-liquid detector of this invention can be arranged in fluid communication with one another in a series manner by the conduits 76 to monitor the liquid level in a tank 67. It is to be understood that each of the sensing elements 10 and 10′ have associated with them similar means of electrical circuits and electrical elements shown in FIG. 1 to to make them operable as described for FIGS. 1 to 4. The tank 67 is supplied with a liquid inlet 68 and a liquid outlet 69, and also a gas inlet 70 and a gas outlet 71 near the top of the tank. Each of the sensing elements 10 and 10′ is placed at a different level, and the gas or liquid content of a sensing element at the particular level at which it is located is an indication of the liquid level in the tank 67. The indications by the sensing elements 10 and 10′ may be used to operate valves to control the supply to the tank, or the indications merely may be used to signal for manual control, or the like.

It is also useful to indicate and control liquid levels in tanks, to measure the viscosity of fluids, to indicate and measure gas pressure changes, or it could be used to only signal with a light or a bell, or the like, the presence of a gas or liquid in a system rather than operate a valving means.

While only one embodiment of our invention has been shown and described along with two specific applications of its use, it is our desire that the invention shall not be limited to such embodiment, but it is to be limited only in accordance with the scope of the appended claims since persons skilled in the art may devise other embodiments still within the limitations of said claims.

We claim:

1. A gas liquid detector comprising a chamber serving as a vapor trap and adapted to be filled with a liquid, a vibratory reed formed from magnetic material and having oppositely disposed surfaces, said reed mounted in said chamber for vibration only in directions transverse to said surfaces whereby vibration is substantially prevented by the resistance of liquid in said chamber contacting at least a part of said surfaces of said reed, an electromagnetic driving coil external to said chamber, means causing said electromagnetic driving coil to generate a vibratory magnetic field, said electromagnetic driving coil positioned so the vibratory magnetic field is magnetically coupled to said reed and exerts a vibratory force on said reed inside said chamber causing said reed to vibrate at a useful amplitude only when gas in the liquid enters the chamber and forces the liquid in said chamber substantially out of contact with said reed, an electromagnetic pickup coil external to said chamber, said pickup coil being magnetically coupled to said reed by the magnetic field generated from said electromagnetic driving coil, and the magnetic field generated from said electromagnetic driving coil forming the only coupling between said reed and the respective driving coil and pickup coil so that the vibration of said reed induces voltages in said pickup coil whereby an indication of the presence of gas in the liquid may be obtained.

2. The gas liquid detector described in claim 1 wherein said reed is mounted in said chamber at one end to permit it to vibrate at any desired frequency.

3. A gas liquid detector comprising a fluid chamber of substantially non-magnetic material, an inlet to said chamber and an outlet from said chamber, a flat strip of resilient magnetic material having oppositely disposed surfaces and mounted at one end in the chamber for vibratory movement in directions transverse to the said surfaces, an electromagnetic driving coil outside the chamber, means connected to said driving coil and causing it to generate a vibratory magnetic field, said driving coil positioned so its axis is substantially parallel to the direction of vibration of said strip and so its magnetic field is coupled to the strip whereby it exerts vibratory forces thereon and causes said strip to vibrate at a useful amplitude only when gas in the liquid enters the chamber and forces the liquid in said chamber substantially out of contact with said strip, an electromagnetic pickup coil outside the chamber and on the opposite side of said strip, said pickup coil being disposed so its axis is substantially parallel to the direction of vibration of the strip and being magnetically coupled thereto by the magnetic field generated from said electromagnetic driving coil, and the magnetic field generated from said electromagnetic driving coil forming the only coupling between said strip and the respective driving coil and pickup coil so that the vibration of said strip induces voltages in said pickup coil whereby an indication of the presence of gas in the liquid may be obtained.

4. A detector for indicating a change in condition of a fluent material comprising a substantially non-magnetic case providing a chamber having first and second end portions joined together by a connecting chamber portion of reduced size extending therebetween, a vibratory reed formed from magnetic material and having oppositely disposed surfaces, said reed being secured at one end to said case and extending from said first end portion of the chamber through the connecting chamber portion of reduced size and into said second end portion of the chamber where it terminates in a free end, said reed being mounted in said chamber for vibration only in directions transverse to said surfaces whereby vibration is substantially prevented by the resistance of liquid in said chamber contacting at least a part of said surfaces of said reed, an electromagnetic driving coil disposed externally of said chamber and positioned on said case at one side of the connecting chamber portion so as to be opposed to one surface of said reed in close proximity thereto, means causing said electromagnetic driving coil to generate a vibratory magnetic field for exerting a vibratory force on said reed inside said chamber causing said reed to vibrate at a useful amplitude only when gas in the liquid enters the chamber and forces the liquid in said chamber substantially out of contact with said reed, and an electromagnetic pickup coil disposed externally of said chamber and positioned on said case at the other side of the connecting chamber portion so as to be opposed to the other surface of said reed in close proximity thereto so that the vibration of said reed induces voltages in said pickup coil whereby an indication of the presence of gas in the liquid may be obtained.

5. A detector for indicating a change in condition of a fluent material as set forth in claim 4, wherein each of said electromagnetic driving coil and said pickup coil has a core of laminated plates of magnetic material, and spools of insulation material having cylindrical barrels respectively interposed between the core and coil of each of said driving coil and said pickup coil.

References Cited by the Examiner

UNITED STATES PATENTS

| 2,550,052 | 4/1951 | Fay | 73—59 |
| 2,616,443 | 11/1952 | Bram | 340—237 X |
| 2,633,016 | 3/1953 | Millington | 73—59 |
| 2,696,735 | 12/1954 | Woodward | 73—59 |
| 2,973,639 | 3/1961 | Banks | 73—290 X |

LOUIS R. PRINCE, *Primary Examiner.*

CHARLES A. CUTTING, ROBERT L. EVANS, JOSEPH P. STRIZAK, RICHARD C. QUEISSER,
*Examiners.*